United States Patent [19]

Davis et al.

[11] 4,430,395
[45] Feb. 7, 1984

[54] CELL WITH OVERFLOW SPOUT

[75] Inventors: Stuart M. Davis, Madison; Greg J. Davidson, Cross Plains, both of Wis.

[73] Assignee: Rayovac Corporation, Madison, Wis.

[21] Appl. No.: 337,007

[22] Filed: Jan. 4, 1982

[51] Int. Cl.³ .............................................. H01M 2/24
[52] U.S. Cl. .................................... 429/158; 429/160; 429/171; 429/174; 429/185
[58] Field of Search .................. 429/185, 171–174, 429/158, 149, 160

[56]         References Cited
         U.S. PATENT DOCUMENTS

| 1,431,859 | 10/1922 | Yai | 429/171 |
|---|---|---|---|
| 1,866,016 | 7/1932 | Deibel | 429/133 |
| 1,908,194 | 5/1933 | Stone | 429/172 X |
| 2,706,214 | 4/1955 | Arbogast | 136/133 |
| 2,740,822 | 4/1956 | Sexe | 429/174 X |
| 3,970,478 | 7/1976 | Jurva | 429/173 X |
| 3,970,479 | 7/1976 | King | 429/173 X |

OTHER PUBLICATIONS

Weir's Engineering Encyclopedia, pp. 1383 & 1384, vol. II Second Ed.

Primary Examiner—Charles F. LeFevour
Attorney, Agent, or Firm—Kenyon & Kenyon

[57] ABSTRACT

A galvanic cell (10), useful in batteries (50), including a can (12). The can (12) is equipped with a spout (20) to permit controlled cell (10) sealing and sealant (18) overflow (52).

17 Claims, 9 Drawing Figures

CELL WITH OVERFLOW SPOUT

TECHNICAL FIELD

The disclosed invention relates to galvanic cells in general and more particularly to asphalt sealed cells and batteries.

BACKGROUND ART

Present multicell batteries utilize cylindrical cells having asphalt seals. A plurality of cells are disposed in a container and are connected together to generate a desired voltage. For example, a typical six volt lantern battery includes four one and one half volt "F" cells.

Briefly, a multicelled battery may be prepared in the following fashion. A plurality (let "X" equal the number of cells) of non-permanently sealed cells having a recessed washer closing off the top of each cell are indexed together. (X-1) wire leads of selected length are fastened to (X-1) of the cell cans whereas the can of the remaining cell is provided with a first contact that is ultimately registered with a terminal in the battery cover. The wire leads are also connected serially with the center terminals of (X-1) of the adjacent cells. The remaining center terminal is provided with a second contact that is ultimately registered with a second terminal in the battery cover. The cells are placed in a battery container either before or after making the connections of the wire leads to the cell cans or center terminals. The connections are normally made by soldering or welding. Asphalt is then introduced into the can to seal the cells and is allowed to overflow the can to immobilize the cells within the battery container. The battery is then closed by the placement, and subsequent crimping, of a battery cover usually including at least two terminals. One terminal is in electrical registration with the first contact whereas the other terminal is registered with the second contact.

Alternatively, a pressure contact systems may be employed wherein no connections are made until after the asphalt sealant is poured. All of the interconnections are effected by springs, contact strips and the like which are fixed to the top cover of the battery container. Upon placing and crimping the cover all connections are made at once.

Dispensing a suitable asphalt seal into the cells which adequately fills the seal area of the cells without overflowing in an uncontrolled manner so as to interfere with the electrical connections has been a continuing problem. Also the uncontrolled overflow of asphalt or other hot sealant material may distort the walls of thermoplastic battery containers. Appearance and electrical connections are degraded thereby rendering the resulting battery nonsaleable.

SUMMARY OF THE INVENTION

There is provided a cell having a can including at least one spout formed therein. The can may be straight walled or may be domed slightly at the open end. The spout allows for reliable asphalt metering while simultaneously effecting controlled asphalt overflow. Heat distortion of the case and electrical contact degradation is substantially reduced. The quantity of asphalt remaining in the seal is determined by the depth of the spout whereas the direction of the asphalt overflow is controlled by spout orientation. The asphalt directly over the spout, being thinner than the remaining body of the seal also acts as a controlled, resealable vent.

PREFERRED MODE FOR CARRYING OUT THE INVENTION

Figure 1:
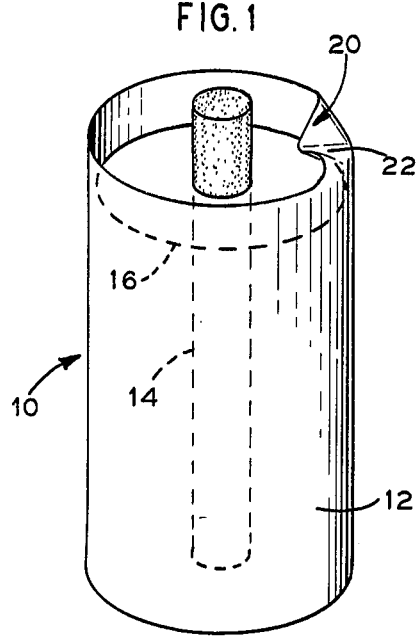
FIG. 1 is a perspective view of a cell employing an embodiment of the invention.

Referring to FIG. 1, there is shown a galvanic cell 10. For the purposes of this disclosure, the expressions "Leclanche", "heavy duty" (zinc chloride), "alkaline", "rechargeable" and "inside out" represent standard battery designs known to practicioners of the art. Accordingly, ordinary accepted meanings apply to these terms. Moreover, it should be understood that the invention is not limited to a particular cell type. It should be appreciated that although brief reference may be made to the Leclanche formulation (solely for illustrative purposes), the invention, as disclosed herein, may be employed with other battery designs or formulations.

The cell 10 includes can 12, current collector (or electrode) 14, mix (or electrolyte) 16 and a separator (not shown). The makeup of these aforementioned components is a function of the cell design. For example, a Leclanche cell with utilize a zinc can (the anode), a carbon electrode, and a depolarizing mix (the cathode) containing manganese dioxide, water, ammonium chloride, zinc chloride, carbon black, graphite and other minor additives.

Figure 5:
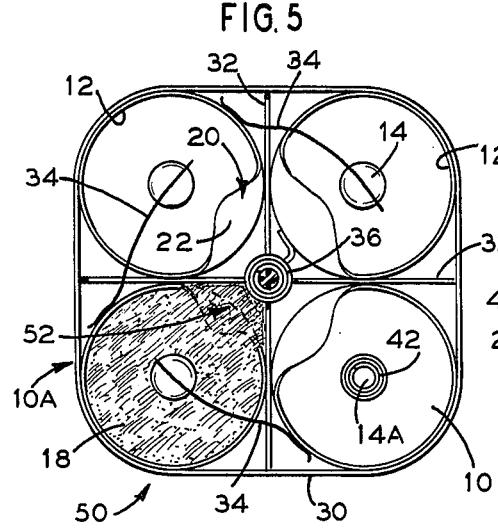
FIG. 5 is a plan view of a battery employing an embodiment of the invention.

As was alluded to earlier, cells destined for battery service may be sealed with asphalt, pitch or other thermoplastic materials (polyvinylchloride, polyethylene, polystyrene, etc.). FIG. 5 shows one cell 10A topped off with an asphalt seal 18. A quantity of asphalt 52 is shown overflowing the cell 10A.

In order to alleviate the problems caused by uneven fill and uncontrollable spillover, the cells 10 have been fashioned with a spout 20 disposed towards the upper portion of the can 12.

FIG. 1 depicts a cell 10 having a section of the can 12 bent or dented inwardly. The lip of the can 12 may be bent inwardly or outwardly by a predetermined dimension to form a bent spout 22.

Figure 2:
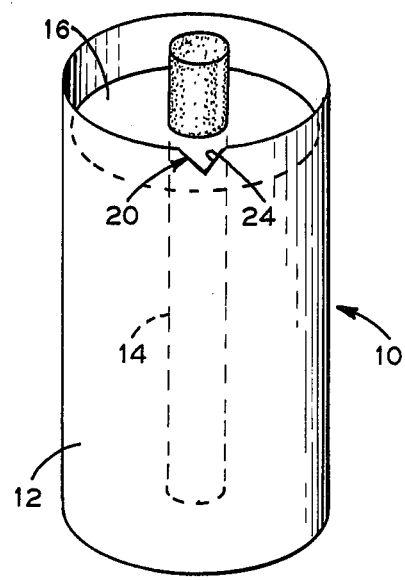
FIG. 2 is a perspective view of a alternate embodiment of the invention.
Figure 3:
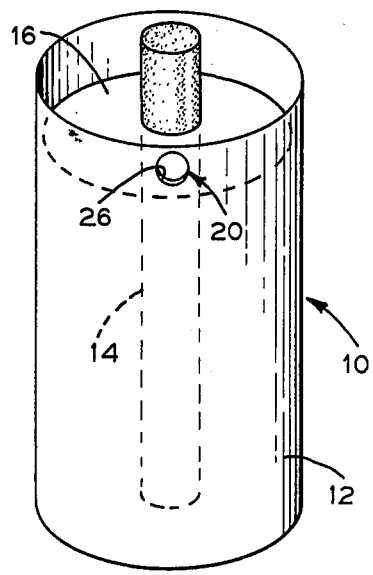
FIG. 3 is a perspective view of an alternate embodiment of the invention.

FIG. 2 shows a cell 10 having a "V" cut spout 24 whereas FIG. 3 illustrates a cell 10 having an aperture spout 26.

Figure 4:
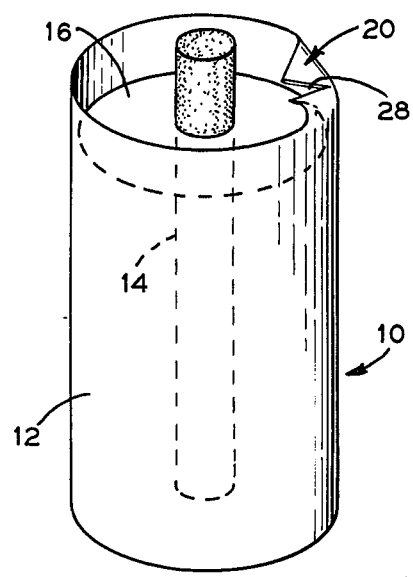
FIG. 4 is a perspective view of an alternate embodiment of the invention.

FIG. 4 depicts a cell 10 with a combined cut and bent spout 28. This embodiment permits a larger flow opening than the bent spout 22. The spout 28 may be bent outwardly as well.

Figure 8:
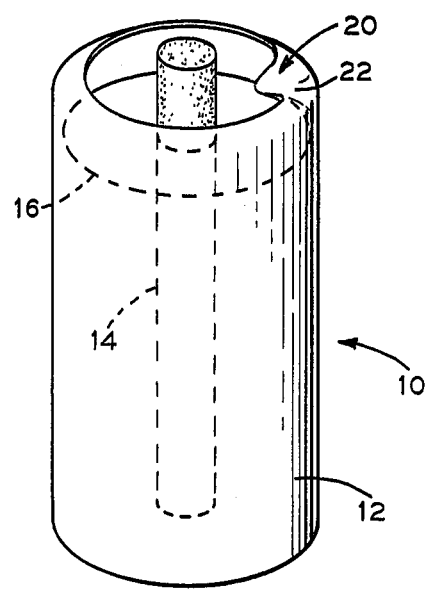
FIG. 8 is a perspective view of an alternate embodiment of the invention.
Figure 9:
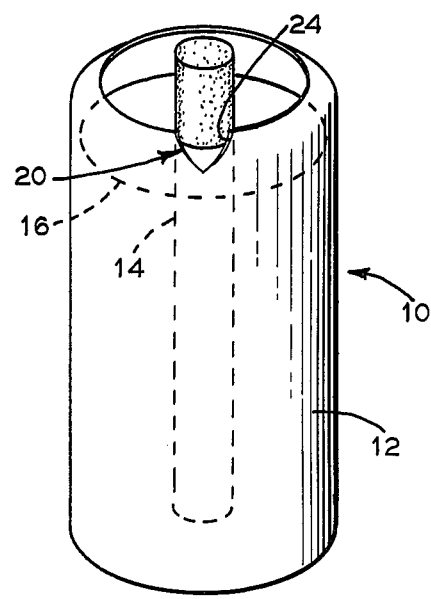
FIG. 9 is a perspective view of an alternate embodiment of the invention.

FIGS. 8 and 9 show spouted cells 10 having domed tops.

The above illustrations are by no means exhaustive. Depending on the circumstances (tools, dies, particular proprietary formulations, etc.) additional spout configurations are possible. For example, " ", " ", " ", " ", etc. spouts may be utilized as well.

Figure 6:
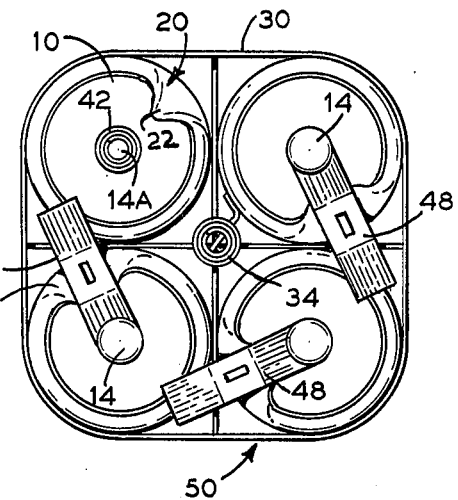
FIG. 6 is a plan view of a battery employing an alternate embodiment of the invention.

FIGS. 5 and 6 show a battery 50. The four cells 10 are disposed within a battery housing 30. Insulating divider 32 serves to insulate the cells 10 from one another.

Figure 7:
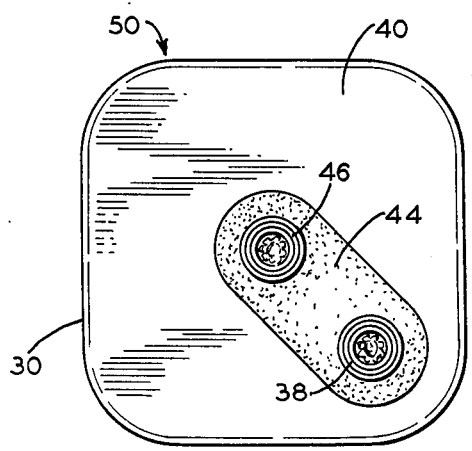
FIG. 7 is a plan view of a battery cover.

FIG. 7 depicts a typical battery cover 40 disposed atop the battery 50. Pursuant to convention, a negative terminal 46 is located in the center of the cover 40 whereas a positive terminal 38 is situated towards a corner of the cover 40. Both terminals 38 and 46 sit above insulating pad 44.

For illustrative purposes only one cell 10A (FIG. 5) is shown sealed with asphalt. However, it should be understood that ordinarily each set of cells is sealed simultaneously. In any event, three cells (letting X=4) are serially connected together by leads 34. Each lead 34 is registered against a can 12 and an adjacent current collector 14. A center spring 36, registered against a can 12, will be in ultimate electrical registration against the negative terminal 46 whereas the remaining unattached current collector 14A will be in ultimate electrical registration against the positive terminal 38 via contact 42.

FIG. 6 depicts an alternate means for ganging together the cells using the bent spout configuration 22 and a pressure contact system of interconnectors. Spring-like conductive tabs 48 are registered against the collectors 14 to lie within the spout 22. The bent spout 22 acts as an electrical contact corridor to facilitate electrical connection between adjacent cells.

The spout configuration 20 is useful in another aspect in that by directing the asphalt overflow 52 away from the walls of the battery container 30, distortion of the outer walls of a battery container 30 may be avoided.

The distortion of the battery container 30 has been a serious cosmetic problem. Previously, this problem was handled by lowering the asphalt temperature. However, by utilizing a lower pour temperature the wetting and adhesive characteristics of the asphalt were compromised in that the asphalt failed to adhere to the can 12 properly. The poor adhesion properties, in turn, resulted in a degraded seal quality. A cell employing a substandard seal will eventually dry out, thereby rendering the battery unusable.

The utilization of cell spouts 20 permits the asphalt to be poured at the optimum (hot) temperature while simultaneously avoiding distortion of the container walls.

The spout concept 20 permits accurate asphalt metering without the attendant problems associated with haphazard overflow. The quantity of asphalt in the seal area is a function of the depth of the spout. The quantity of desirable overflow (Overflow is utilized to immobilize the cells within the container 30.) is the weight of the asphalt metered minus the seal weight. Moreover, the direction of the overflow may be controlled by the judicious placement of the cans within the battery.

While in accordance with the provisions of the statue, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A galvanic cell comprising a container having side walls and an open end, the open end of the container having an edge, anodic material, cathodic material, and an electrolyte disposed within the container, a sealant sealing the open end of the container, a sealant overflow spout formed in the cell wall within or adjacent to the edge, the spout forming a passageway for an excess of the sealant to flow in a directed manner and harden outside the confines of the container.

2. The cell according to claim 1 wherein the spout is a bent section in the cell wall.

3. The cell according to claim 1 wherein the spout is a cutout in the cell wall.

4. The cell according to claim 1 wherein the spout is an aperture formed in the cell wall.

5. The cell according to claim 1 wherein the sealant is asphalt.

6. The cell according to claim 1 wherein the sealant is a thermoplastic material.

7. The cell according to claim 1 wherein the open end is domed.

8. The cell according to claim 1 wherein a plurality of cells are electrically connected together to form a battery.

9. In combination with a battery including a plurality of galvanic cells, each cell having a container, the container having side walls and an open end, the open end of the container having an edge, the battery comprising a receptacle, the cells disposed within the receptacle, means for electrically connecting the cells together to generate a selected voltage, means for connecting the battery to external electrical equipment, the cells including a sealant sealing the open end of the container, a sealant overflow spout formed in the cell wall within or adjacent to the edge, the spout forming a passageway for an excess of the sealant to flow in a directed manner and harden outside the confines of the container.

10. The conbination according to claim 9 wherein the spout is a bent section in the cell wall.

11. The combination according to claim 9 wherein the spout is a cutout in the cell wall.

12. The combination according to claim 9 wherein the spout is an aperture formed in the cell wall.

13. The combination according to claim 9 wherein the open end is domed.

14. The conbination according to claim 9 wherein the sealant is asphalt.

15. The combination according to claim 9 wherein the sealant is a thermoplastic material.

16. The combination according to claim 9 wherein the the excess sealant stabilizes the cells within the receptacle.

17. The combination according to claim 9 wherein the spout forms an electrical contact corridor for the means electrically connecting the cells together.

* * * * *

UNITED STATES PATENT AND TRADEMARK OFFICE
CERTIFICATE OF CORRECTION

PATENT NO. : 4,430,395
DATED : February 7, 1984
INVENTOR(S) : Stuart M. Davis and Greg J. Davidson It is certified that error appears in the above—identified patent and that said Letters Patent is hereby corrected as shown below:

Col. 2, line 7, change second occurrence of "a" to --an--.

Col. 2, line 43, change "with" to --will--.

Col. 3, lines 6 and 7, in between quotes insert -- " ʊ " " ʟ " " ʒ " " ʑ " --.

Col. 4, line 46, Claim 10, change "conbination" to --combination--.

Col. 4, line 54, Claim 14, change "conbination" to --combination--.

Signed and Sealed this

Twenty-second Day of January 1985

[SEAL]

Attest:

DONALD J. QUIGG

Attesting Officer    Acting Commissioner of Patents and Trademarks